United States Patent
Artigas et al.

(10) Patent No.: US 11,890,706 B2
(45) Date of Patent: Feb. 6, 2024

(54) ASSEMBLING PARTS IN AN ASSEMBLY LINE

(71) Applicant: ABB SCHWEIZ AG, Baden (CH)

(72) Inventors: Jordi Artigas, Barcelona (ES); Roger Pons Bertran, La Torre de Calaramunt (ES); Jorge Vidal Ribas, Esplugues de Llobregat (ES); Biao Zhang, West Hartford, CT (US); Ramon Casanelles Moix, Sant Cugat del Valles (ES)

(73) Assignee: ABB Schweiz AG, Baden (CH)

( * ) Notice: Subject to any disclaimer, the term of this patent is extended or adjusted under 35 U.S.C. 154(b) by 473 days.

(21) Appl. No.: 16/967,960

(22) PCT Filed: Feb. 6, 2019

(86) PCT No.: PCT/EP2019/052911
§ 371 (c)(1),
(2) Date: Aug. 6, 2020

(87) PCT Pub. No.: WO2019/154858
PCT Pub. Date: Aug. 15, 2019

(65) Prior Publication Data
US 2020/0368861 A1 Nov. 26, 2020

(30) Foreign Application Priority Data
Feb. 6, 2018 (EP) .................................. 18382065

(51) Int. Cl.
*B23P 19/04* (2006.01)
*B62D 65/00* (2006.01)
*G05D 1/02* (2020.01)

(52) U.S. Cl.
CPC .............. *B23P 19/04* (2013.01); *B62D 65/00* (2013.01); *G05D 1/0246* (2013.01)

(58) Field of Classification Search
None
See application file for complete search history.

(56) References Cited

U.S. PATENT DOCUMENTS 4,926,544 A * 5/1990 Koyanagi ............ G05D 1/0297
29/714
5,239,739 A 8/1993 Akeel et al.
(Continued)

OTHER PUBLICATIONS

International Search Report and Written Opinion of the International Searching Authority. International Application No. PCT/EP2019/052911 issued by the European Patent Office, dated Apr. 16, 2019, 16 pages, Rijswijk, Netherlands.
(Continued)

*Primary Examiner* — Jacob J Cigna
(74) *Attorney, Agent, or Firm* — Peter B. Scull

(57) ABSTRACT

A method for assembling parts in an assembly line, such as an automotive final assembly line, is disclosed. The method includes advancing a part along the assembly line with an Automated Guided Vehicle (AGV), arranging a first real time vision system to monitor the position of the AGV in at least two directions, and providing the readings of the first real time vision system to a controller arranged to control an assembly unit of the assembly line to perform an automated operation on the part that is advanced or supported by the AGV. An assembly line is also disclosed.

13 Claims, 7 Drawing Sheets

(56) References Cited

U.S. PATENT DOCUMENTS

2011/0087360 A1     4/2011   Chen et al.
2013/0035783 A1     2/2013   Scheuerman et al.
2015/0105907 A1     4/2015   Aiso et al.

OTHER PUBLICATIONS

Heping Chen et al., "Robotic wheel loading process in automotive manufacturing automation", The 2009 IEEE/RSJ International Conference on Intelligent Robots and Systems, Oct. 11-15, 2009, St. Louis, MO, pp. 3814-3819, IEEE, Piscataway, NJ, USA.

* cited by examiner

ASSEMBLING PARTS IN AN ASSEMBLY LINE

The present disclosure is related to a method for assembling parts in an assembly line, such as an automotive final assembly line, to an assembly unit, and also to assembly lines.

BACKGROUND

Automotive production lines for manufacturing vehicle bodies usually include a final assembly line where human operators and/or robots may operate to assemble parts such as seats, doors, windshield, wheels, steering mechanisms, etc. Vehicle bodies are usually advanced continuously along the assembly line by suitable transport, such as a conveyor or AGVs (Automated Guided Vehicles).

An assembly robot for such an assembly line may include an end effector carrying a tool or carrying an assembly element to be attached or mounted to the vehicle body, and the end effector of the robot can be controlled to perform a certain operation in a target position of the vehicle body. In some cases the robot may be driven on tracks parallel to the assembly line.

However, robot automation has not yet been able to replace human operators to a large extent in this kind of application: in final assembly lines there are several sources of errors, tolerances and inaccuracies, for example arising from the continuous motion of the parts, e.g. vehicle bodies, in the line, that may be irregular, for example subject to vibrations. This makes it difficult for robots, which generally run on predetermined programs, to work efficiently.

Previously, an assembly line may have included a vehicle body advanced continuously by a conveyor. A digital encoder may have been provided on an axle of the conveyor drive and the end effector of an assembly robot controlled to track the movement of the conveyor, adopting a position that is effectively stationary with respect to the vehicle body. To correct errors due to the conveyor vibration with respect to the conveyor drive axle, an optical sensor on the conveyor could be used to compare the frequency and amplitude of relative movement over several cycles, and synchronise the robot assembly action to the peak of conveyor movement. A robot guiding sensor, such as a measurement laser, measures the displacement that is required for the end effector to reach the target on the vehicle body. In other embodiments the vehicle body may be stopped in front of the robot and the coordinates of a target point are determined using the measurement laser.

Even though this this may be a solution for compensating errors due to the conveyor vibration, the solution involves synchronising the assembly operation to a specific and estimated point of the conveyor movement cycle, which makes it likely that the target may move between the reading of the measurement laser and the actual assembly operation.

Furthermore a compensation of errors in the position of the skid on the conveyor, and/or of the vehicle body on the skid, requires that the conveyor is stopped for determining the coordinates of points of the vehicle body. Therefore this does not teach how to compensate for this kind of errors without stopping the conveyor.

Other sources of positioning errors, such as those due to the limited resolution of the encoder on the conveyor drive axle, are not appropriately addressed.

It would be desirable to facilitate a higher degree of robot automation in assembly lines, and particularly automotive final assembly lines, by providing a method or a system for assembling parts which at least partially overcome prior disadvantages. For example, it would be desirable to provide solutions to perform assembly operations in motion, i.e. on a moving part, and/or to allow compensating several sources of error.

SUMMARY

According to a first aspect, a method for assembling parts in an assembly line, such as an automotive final assembly line, is provided. The method may include: advancing a part along the assembly line with an Automated Guided Vehicle (AGV), arranging a first real time vision system to monitor the position of the AGV in at least two directions, and providing the readings of the first real time vision system to a visual servoing controller arranged to control an assembly unit of the assembly line to perform an automated operation on the part that is advanced or supported by the AGV.

Monitoring the movement of the AGV in at least two directions in real time and using the readings in a visual servoing control of the assembly unit, allows a very fast and accurate location of a target area of the part on which an operation has to be performed, for example even before the part has reached the area of reach of the assembly unit; furthermore the movement of the assembly unit may be synchronised with the movement of the AGV based on the first real time vision system, such that the assembly unit may work on the part as if it was stationary with respect to the part, and therefore without the need to compensate for the advance of the AGV and its positioning errors, for example due to unevenness of the floor and consequent vertical vibrations of the AGV: this allows increased accuracy and/or speed in the overall operation of the assembly unit.

The method is also safe, as for example in case of a stop of the AGV there is a lower risk of a collision between the assembly unit and the part on which the operation is performed, as the assembly unit may be synchronised in real time with the advance of the AGV.

In some examples the assembly unit includes an industrial robot that is provided with an end effector, and the part has a target area at which an assembly operation is to be performed, the method including, while the part is advancing: providing the readings of the first real time vision system to the controller of the robot to synchronise the displacement of the robot with the advance of the AGV along the assembly line in an advance direction; and performing the assembly operation at the target area with the industrial robot; the assembly operation performed with the industrial robot including: a visual servoing process in which the movement of the end effector of the robot is controlled in real time based at least on the readings of a second real time vision system arranged to monitor the position of the target area; and a compliant behaviour process in which the movement of the end effector of the robot is controlled at least to allow compliant behaviour of the end effector in at least one direction.

The combination of such first and second real time vision systems has multiple advantages. The second vision system may locate a target area very fast in order to start its associated visual servoing process, as the first vision system provides accurate positioning information for each individual part travelling along the line and reaching the second vision system, such that the second vision system may have a smaller field of vision. This of course means that less time will be needed for the operation on the part.

Furthermore, the combination of the two real time vision systems as disclosed above allows performing automated operations that a single vision system may not be able to achieve, or may be subject to errors and even to the risk of collisions.

For example, a complex assembly operation such as mounting the cockpit in a vehicle in an automotive final assembly line is difficult to automate because it involves a robot first inserting the cockpit through an open door in the car body, and then mounting the cockpit in the correct position inside the car body. A vision system that is suitably configured and attached on the end effector of the robot for locating the target for the second operation and mounting the cockpit cannot see its target area from outside the vehicle body, and is not easily configured to safely locate the opening and the position of the door, which depends on an earlier assembly station in the line, for the first part of the operation. In such a case the readings of the first real time vision system that monitors the movement of the AGV may be used at least in a first operation or a first part of the movement of the robot or of its end effector, while the second real time vision system that monitors the position of the target area may start operating in a second operation or second part of the movement of the robot or its end effector.

After the second real time vision system has started operating because it has located the target area, the first real time vision system may also continue operating, the outputs of the two systems being combined in the visual servoing controller arranged to control the movement of the end effector of the robot during the operation: this movement of the end effector may therefore be a sum of the movements of the AGV and the movements of the target part on the AGV.

In operations where one of the two vision systems can locate the target area and perform the whole assembly operation, the provision of a further redundant system allows higher assembly speeds, and/or detecting e.g. positioning errors or failures of one of the systems, preventing further damage.

In some examples the controller of the robot may synchronise the displacement of the robot such that the robot travels on a track synchronised with the advance of the AGV based on the readings of the first real time vision system, and it may displace the end effector of the robot synchronised with oscillations of the AGV based on the readings of the first real time vision system, for example in a vertical direction synchronised with vertical oscillations of the AGV.

In some examples the controller of the robot may displace the end effector of the robot at least synchronised with the advance of the AGV along the assembly line in the advance direction based on the readings of the first real time vision system, and it may displace the end effector of the robot also synchronised with the vertical oscillations of the AGV based on the readings of the first real time vision system.

A real time vision system may monitor or track the AGV in a very accurate way, such that also vertical or other positioning errors of the target area that are due to AGV oscillations may be compensated or reduced already at the level of the synchronisation of the robot and its end effector with the movement of the AGV.

A vision sensor of the first real time vision system may capture an image of a marker or feature of the AGV, an image processing module of the first real time vision system may provide an error signal representative of the displacement of the AGV based on the captured image, and the controller may control the assembly unit, for example a robot, at least based on the error signal.

According to a second aspect, the present disclosure provides an automotive final assembly line, including a transport system with Automated Guided Vehicles (AGVs) to advance parts along the assembly line, an assembly unit, and a first real time vision system arranged to monitor the position of the AGV in at least two directions, the readings of the first real time vision system being provided to a visual servoing controller arranged to control an automated operation to be performed on a part that is advanced or supported by the AGV.

In some examples the assembly unit includes: an industrial robot that is provided with an end effector; a second real time vision system arranged to monitor the position of a target area of a part that advances along the assembly line; a compliant behaviour system to allow compliant behaviour of the end effector in at least one direction; and a robot controller to control the movement of the end effector of the robot to perform an assembly operation at the target area of the part; the output of the first real time vision system and the output of the second real time vision system being connected to a controller of the robot of the assembly unit, and the robot controller being configured to perform an assembly operation including: a displacement of the industrial robot synchronised with the advance of the AGV along the assembly line in an advance direction based on the readings of the first real time vision system; a visual servoing process in which the movement of the end effector of the robot is controlled in real time based on the readings of the second real time vision system; and a compliant behaviour process in which the movement of the end effector of the robot is controlled to allow compliant behaviour thereof.

A displacement of the industrial robot synchronised with the advance of the AGV along the assembly line in an advance direction may be performed by moving the whole robot along a track parallel to the advance direction (e.g. mounting the robot on an additional programmable linear axis), or, in a more cost effective variant saving the cost of the track and extra axis, by operating the programmable axes of the robot in such a way that the end effector of the robot is displaced synchronised with the advance of the AGV.

In the latter case, where the base of the robot is stationary, the provision of the first real time vision system monitoring the movement of the AGV is particularly useful, because the cycle time for the operation is limited by the advance speed of the AGV and the working area, or maximum reach, of the end effector: the reduction in the time required to locate the target area allowed by the first vision system is therefore most efficient, as it means that a higher proportion of the available cycle time may be employed in the assembly operation itself.

In some examples the first real time vision system includes a vision sensor to capture an image of a marker or feature of the AGV, and an image processing module to receive the captured image and to provide to the controller an error signal representative of the displacement of the AGV, based on the captured image.

In any of the different examples mentioned above, the first real time vision system may be provided with a vision sensor, such as a camera, which may be mounted stationary in the assembly line, in correspondence with one or more assembly units, or may be mounted displaceable along at least part of the path of the AGV, for example along a length of the path where one or more assembly units operate. In the first case, the vision sensor may detect the arrival of each AGV and monitor its movement until the AGV exits the field of vision of the sensor, or until the assembly unit completes the operation on the part carried by the AGV. In the second case, the sensor may be mounted on a carriage along the path of the AGV, and the movement of the carriage may be controlled by the visual servoing controller to follow the movement of the AGV in the direction of advance thereof; or the sensor may be mounted on a robot of the assembly unit, the robot being displaceable on a track parallel to the path of the AGV and controlled by the visual servoing controller to follow the movement of the AGV in the direction of advance.

The first real time vision system may also be provided with two or more vision sensors: for example, two or more stationary sensors may be provided to cover all the travel path of an AGV in correspondence with an assembly unit that performs an operation on the part carried by the AGV.

A vision sensor of the first real time vision system may be arranged to monitor one or more features or markers of an AGV: for example, a vision sensor, especially but not only a stationary vision sensor, may be arranged to first detect and monitor a marker or a feature of the leading end zone of an AGV in the direction of advance, and then another marker or feature of the trailing end zone of the AGV, as they come into the field of vision of the sensor.

Also disclosed herein is a method for assembling parts in an assembly line, such as an automotive final assembly line including advancing a part, for example a vehicle body, along the assembly line, the part having a target area at which an assembly operation is to be performed, and while the part is advancing, performing the assembly operation at the target area, with an industrial robot that is provided with an end effector. The assembly operation performed with the industrial robot includes a visual servoing process in which the movement of the end effector of the robot is controlled in real time based at least on the readings of a real time vision system arranged to monitor the position of the target area, and a compliant behaviour process in which the movement of the end effector of the robot is controlled at least to allow compliant behaviour of the end effector in at least one direction.

As employed in the present disclosure, visual servoing refers to a vision-based robot control method in which the degrees of freedom of the robot to perform a certain operation (e.g. inserting a hinge pin into a pinhole) are not controlled according to a predetermined program, identical for every repetition of the operation, but are controlled in real time using information provided by a vision sensor, such that the robot is progressively guided by the vision system towards the target area, and each time the operation is performed the robot may undergo different movements.

In the present disclosure, compliant behaviour refers to a robot control method in which the robot is "soft", i.e. it is not stiff, in at least one direction of movement, such that the robot is allowed to deviate to a certain extent from an intended trajectory depending on the applied external force, e.g. if it encounters a mechanical resistance. There are several methods and techniques to control a robot with compliant behaviour, such as using a force sensor.

In methods for assembling parts disclosed herein, the movement of the assembly robot and its end effector, which may e.g. carry an element to be assembled on the part at the target area thereof, is done by performing a visual servoing process in real time, using data from a vision system that monitors, directly or indirectly, the actual position of the target area of the vehicle body or other part.

Such real time visual servoing based on the monitoring of the target area allows at least partly compensating errors due to tolerances in tracking the advance of the part (e.g. due to the resolution of an encoder tracking the conveyor motion), as well as errors with respect to the intended trajectory of the part due to vibrations or other uneven movement of the conveyor or other transport system, as well as errors due to differences between the CAD design of the part and the physical shape/features of the part, and positioning errors of the part on the conveyor. Furthermore, this may be achieved without stopping the advance of the part.

In other words, the deviations from the intended trajectory, vibrations, and other inaccuracies in the positioning of the target area are addressed by the fact that the robot is guided in real time by a vision system that monitors the position of the target area of the actual part on which the assembly operation is being carried out.

The compliant behaviour process, in combination with the visual servoing, deals safely and efficiently with small residual errors in the positioning of the end effector of the robot in the final movements of the assembly operation, when the end effector, or an assembly element held by the end effector, contacts the part.

In some examples, the part may be advanced continuously along the assembly line, at a constant or a variable speed.

As mentioned above, the assembly methods of the present disclosure are particularly efficient with parts that move continuously, because the visual servoing and compliant behaviour provide the ability to at least partly compensate in real time positioning errors, arising from multiple sources, between the end effector of the robot (or an assembly element carried by the end effector) and the part, and therefore the continuous advance of the part is not a major hurdle for the accuracy of the assembly operation.

In some embodiments of the method, the real time vision system includes a vision sensor mounted on the robot so that it moves together with the end effector. However, in embodiments of the above method the vision sensor may also be mounted on another part of the robot, or it may be external to the robot.

The real time vision system may include a vision sensor arranged to obtain images of the target area. However, it may be preferable to arrange the vision sensor to obtain images of a marker that moves together with the target area, for example a marker close to the target area. This is useful especially, but not exclusively, if the sensor is mounted to move with the end effector of the robot, as the end effector itself may hinder at some point the view of the target area by the vision sensor. A marker may also be a better solution if the target area, due to its configuration, is not easily tracked by an artificial vision system, e.g. if it lacks contrast.

The marker may be a visible element or feature of the part itself, for example one that provides a clear, contrasted image for fast and accurate detection by the vision sensor, such as a hole in the part, an edge of an opening, or a particular shape or line. It may also be a marker in the form of a graphic symbol, barcode, QR code or the like, which may be applied on the part, or provided on a label that is then attached to the part, and in this case the marker may be provided on the part before the assembly operation and removed from the part after the assembly operation.

In some embodiments of the method, during the compliant behaviour process the movement of the end effector of the robot is controlled at least based on the readings of a force/torque sensor mounted on the robot to detect external forces acting on the end effector.

A force/torque sensor may be typically provided with resistance strain gauges to measure the strain applied in several degrees of freedom, for example in all six degrees of freedom (three forces and three torques), and suitable electronics to process the signals from the strain gauges and communicate with an external device, for example with the robot controller.

Such a sensor may be inserted for example between the wrist and the end effector of the robot to detect the strain between the two elements and provide information about the external forces acting on the end effector, and therefore about the relative position between the end effector and the part on which the assembly operation is carried out.

In some embodiments of the method, each of the visual servoing process and the compliant behaviour process are simultaneously active during the assembly operation, and the movement of the end effector results from a combination of both processes.

For example, the end effector may be guided based on a real time vision system to converge towards a final assembly position, but this convergence is modified or softened by the compliant behaviour, for example depending on the readings of a force/torque sensor, to optimise the ability of the robot to perform the final step of the assembly operation, which is usually the more critical step, safely and efficiently.

For example, the robot controller may receive signals from a real time vision system which are representative of a desired position of the end effector according to the vision system, and may also simultaneously receive signals from a compliant behaviour system which are representative of a desired position of the end effector according to the compliant behaviour system, and the robot controller may control the movement of the end effector based on a combination of the received signals in real time.

At the beginning of the assembly operation, and while the end effector and the assembly element it carries are still at a distance from the target area, the signals from the compliant behaviour system will normally be zero, or negligible, because no external force is acting on the end effector.

Consequently, in this phase the signals from the compliant behaviour system will have no effect in the combination, and the controller will move the end effector as signalled and guided by the vision system.

However, when there is a physical interaction, i.e. contact, between the assembly element or the end effector and an external object, such as the target area or a neighbouring area, then the signals from the compliant behaviour system will not be zero. The desired position to which the end effector should move, according to the vision system, will not be the same as the desired position according to the compliant behaviour system.

The robot controller will then combine the desired positions, for example making a weighted sum, and move the end effector accordingly. The relative weight given in the combination to the vision system and to the compliant behaviour system may depend on the specific assembly operation: e.g. more relative weight may be given to the compliant behaviour system in cases of more fragile parts, and more relative weight may be given to the vision system in cases where the time available for the assembly operation is limited.

Thus, it will be appreciated that a visual servoing process and a compliant behaviour process may occur simultaneously, and the movement of the end effector of the robot is controlled in real time based on both the inputs of the vision system and the inputs of the compliant behaviour system.

In some implementations of the method, the part is advanced on a conveyor, and before and during the assembly operation the robot is controlled to travel in the advance direction of the assembly line synchronised with the advance of the conveyor. In examples of the method, the conveyor may be any transport system suitable to support and advance the part, such as for example a skid on a conveyor belt driven by chains, a skid hanging from an overhead carrier, an Automated Guided Vehicle, or other.

Depending on the specific circumstances of each assembly operation, the robot base may be maintained stationary with respect to the conveyor, and the end effector of the robot may be caused to move taking into account the speed of the conveyor by controlling the robot axes between the base and the wrist. In other circumstances, the robot may be mounted on a track parallel to the assembly line and caused to travel along the track. This may be useful e.g. if the assembly operation requires a displacement longer than the maximum reach of the end effector, or to provide better positioning of the end effector with respect to the target area, and/or to provide more flexibility to the assembly operation. The robot controller may in this case control the displacement along the track as an additional linear axis of the robot.

The advance of the conveyor may be tracked by several possibilities, such as for example using an encoder arranged to read the rotation of a driving axle of a conveyor belt.

In some examples, once the robot is travelling synchronised with the advance of the conveyor, and before starting a visual servoing process of the assembly operation, the position of the target area of the part is determined by taking a camera capture, for example a general image of the part, and the end effector of the robot is moved towards the position of the target area, up to a predetermined distance.

This movement may be a first approximation of the robot effector to the target area, at a relatively fast speed, i.e. at a speed that is on average faster than the speed during the visual servoing and compliant behaviour processes. In some examples, and depending on the operation, the end effector of the robot, or an assembly element held by the end effector, may be placed at a distance between 50 and 500 mm from the target area, for example a distance between 100 and 200 mm.

In embodiments of any of the methods disclosed above, the part may be advanced along the assembly line by an Automated Guided Vehicle (AGV). In this case, an additional real time vision system may be arranged to monitor the position of the AGV, and the readings of the additional real time vision system may be provided to the controller of the robot.

The additional real time vision system allows tracking not only the advance of the AGV in the assembly line direction, but also its movement e.g. in a vertical direction (for example due to an uneven floor), and/or in a horizontal direction perpendicular to the advance direction, i.e. in the three directions of an x-y-z coordinate system. Tracking of the AGV may therefore be more accurate, and vertical or other positioning errors of the target area that are due to AGV oscillations may be compensated or reduced already at the level of the synchronisation of the robot with the movement of the AGV.

Also disclosed herein is an assembly unit for an assembly line, such as an automotive final assembly line. The assembly unit may include an industrial robot that is provided with an end effector, a real time vision system arranged to monitor the position of a target area of a part that advances along the assembly line, a compliant behaviour system to allow compliant behaviour of the end effector in at least one direction, and a robot controller to control the movement of the end effector of the robot to perform an assembly operation at the target area of the part, the robot controller being configured to perform an assembly operation including at least a visual servoing process in which the movement of the end effector of the robot is controlled in real time based on the readings of the real time vision system, and a compliant behaviour process in which the movement of the end effector of the robot is controlled to allow compliant behaviour thereof.

In some embodiments of the assembly unit, the real time vision system includes a vision sensor and an image processing module to compare an image captured by the vision sensor to a reference image, and provide an error signal representative of the difference between a current position and a desired position of the end effector.

In such an assembly unit the compliant behaviour system may include a sensor to detect external forces acting on the end effector, such that the robot controller may control the movement of the end effector with compliant behaviour during at least a step of an assembly operation, e.g. once the end effector, or an assembly element held by the end effector, contacts the target area.

Such external forces may be detected by determining the current consumed by the actuators of the robot, e.g. the internal motors for moving each robot axis: the consumed current of a motor and the torque on the motor are proportional, and the torque on the motor is a function of the robot dynamics and of external forces acting on the robot, so sensing or measuring the consumed current allows determining the external forces.

In other examples the compliant behaviour system may include a force/torque sensor mounted on the robot between a wrist of the robot and the end effector. The output of the force/torque sensor may be connected to the controller of the robot, such that the controller may control the movement of the end effector with compliant behaviour.

According to a further aspect, the present disclosure provides an automotive final assembly line including a transport system to advance a part, such as a vehicle body, along the assembly line, and an assembly unit as disclosed in any of the above examples, arranged to perform an assembly operation in target area of the part or vehicle body.

According to some embodiments, an automotive final assembly line as disclosed herein further includes a marker applying unit, arranged upstream of the assembly unit, for applying a marker to the part, and a marker removing unit, arranged downstream of the assembly unit, for removing the marker from the part.

In some examples, the transport system of the automotive final assembly line includes an Automated Guided Vehicle (AGV), and the assembly unit includes an additional real time vision system arranged to monitor the position of the AGV as it advances along the assembly line, the output of the additional real time vision system being connected to a controller of the robot of the assembly unit.

Also disclosed herein is an assembly line, such as for example an automotive final assembly line, including an Automated Guided Vehicle (AGV) to advance a part along the assembly line, the AGV being provided with an AGV marker, a real time vision system arranged to track the position of the AGV marker as it advances along the assembly line, and a visual servoing control unit to control an automated operation to be performed on the part that is advanced by the AGV.

Such a marker may be a visible element or feature of the AGV itself, for example a hole of the AGV body, an edge of an opening, or a particular shape or line of the AGV. It may also be a marker in the form of a graphic symbol, barcode, QR code or the like, which may be applied on the AGV or provided on a label that is then attached to the AGV.

If the marker is not a feature of the AGV itself, it may be provided on the AGV before the AGV is employed to transport a part along an assembly line, for example when the AGV is stationary.

The AGV may be provided with several markers, in order to facilitate its monitoring with a vision system, for example if the advance of the AGV may bring a marker out of the field of view of the vision system. Additionally, or alternatively, a vision sensor of the vision system may be mounted displaceable, for example on a carriage mounted displaceable on a track parallel to the AGV advance.

For example, the visual servoing control unit may control the operation of an industrial robot based on the readings of the real time vision system. For example, it may synchronise the displacement of an industrial robot with the advance of the AGV along the assembly line in an advance direction, and may also synchronise the movement of the robot with the movement of the AGV in other directions of an x-y-z coordinate system, for example in a vertical direction, for example to account for oscillations of the AGV due to unevenness of the floor on which the AGV is travelling. This allows accurate tracking of the AGV, and allows compensating or reducing vertical errors or positioning errors in other directions due to AGV oscillations.

Additional objects, advantages and features of embodiments will become apparent to those skilled in the art upon examination of the description, or may be learned by practice.

BRIEF DESCRIPTION OF THE DRAWINGS

Particular embodiments of the present device will be described in the following by way of non-limiting examples, with reference to the appended drawings, in which.

DETAILED DESCRIPTION

Figure 1:
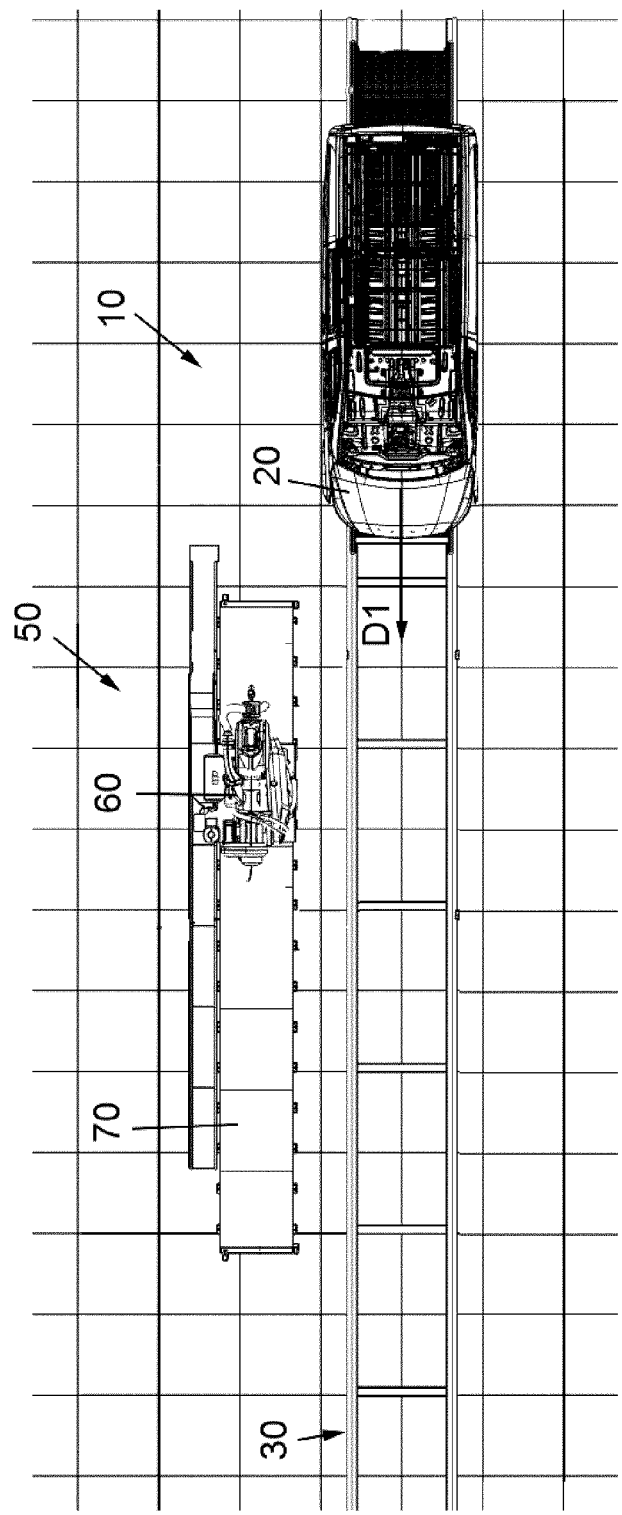
FIG. 1 illustrates a simplified plan view of an assembly line with an assembly unit, according to an example.
Figure 2:
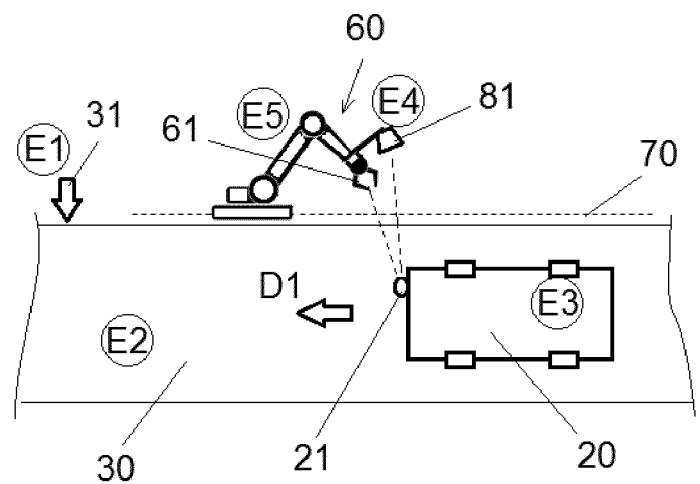
FIG. 2 is a schematic representation of an assembly line with an assembly unit similar to that of FIG. 1.

FIGS. 1 and 2 show, in plan view and schematically respectively, an assembly line 10, in this example an automotive final assembly line, where a part, which in this case is a vehicle body 20, travels in an advance direction D1 on a transporting system such as a skid (not shown) set on a conveyor 30, past an assembly unit 50. For example, the vehicle body 20 may be transported at a continuous speed of around 100 mm/s.

The vehicle body 20 or other part includes a target area 21, where an assembly operation is to be performed. Examples of assembly operations which may be performed with implementations of the method and unit disclosed herein, may be disassembling the doors before other internal elements are inserted, assembling the vehicle cockpit, placing the carpet, placing the seats, placing the battery, placing the spare wheel, fixing the sealing joints in place by rolling, assembling the doors, etc.

A measuring device may be provided to monitor the advance of the conveyor: for example, a digital encoder 31 may be arranged in correspondence with a drive axle (not shown) of the conveyor 30.

The assembly unit 50 includes an industrial robot 60, which may include a controller and a number of programmable degrees of freedom or axes between a base and a wrist, each degree of freedom having an associated driving element, such as a motor, controlled by the robot controller (such details of an industrial robot are known, and not shown in the figures).

The robot 60 is provided with a corresponding end effector 61 for example a gripper or other suitable element, attached to the robot wrist. In the example, the robot 60 is mounted on a track 70 and provided with a suitable drive (not shown), such that it can travel parallel to the conveyor in the direction D1.

According to examples disclosed herein, the assembly unit 50 also includes a vision system 80 with a vision sensor 81, for example a camera, which may be mounted on the robot. The vision sensor 81 may be mounted such that it moves together with the end effector 61 of the robot 60.

In FIG. 2 a number of different sources of errors and tolerances that may occur in the system have been indicated by E1, E2, E3, E4, E5, respectively representing:
E1: conveyor tracking, which may be inaccurate due to the limited encoder resolution, e.g. of +/−2 mm;
E2: errors arising from conveyor dynamics (vibration), due to the movement of the conveyor not being as smooth as that of the drive axle monitored by the encoder;
E3: positioning errors between each vehicle body and the skid, and between each skid and the conveyor, and errors due to geometry differences between one vehicle body and another;
E4: errors related to the frame rate the vision system can provide;
E5: errors related to robot kinematics.

As explained in the above summary, implementations of assembly methods and assembly units disclosed herein allow compensating errors E1, E2 and E3 in an efficient way, as the real time visual servoing is not affected by these sources of error. Errors E3 could also be compensated with other solutions, but errors E1 and E2 are particularly difficult to compensate with known solutions. Furthermore, a compliant behaviour process allows addressing any remaining errors, such as errors E4 and E5.

Figure 3:
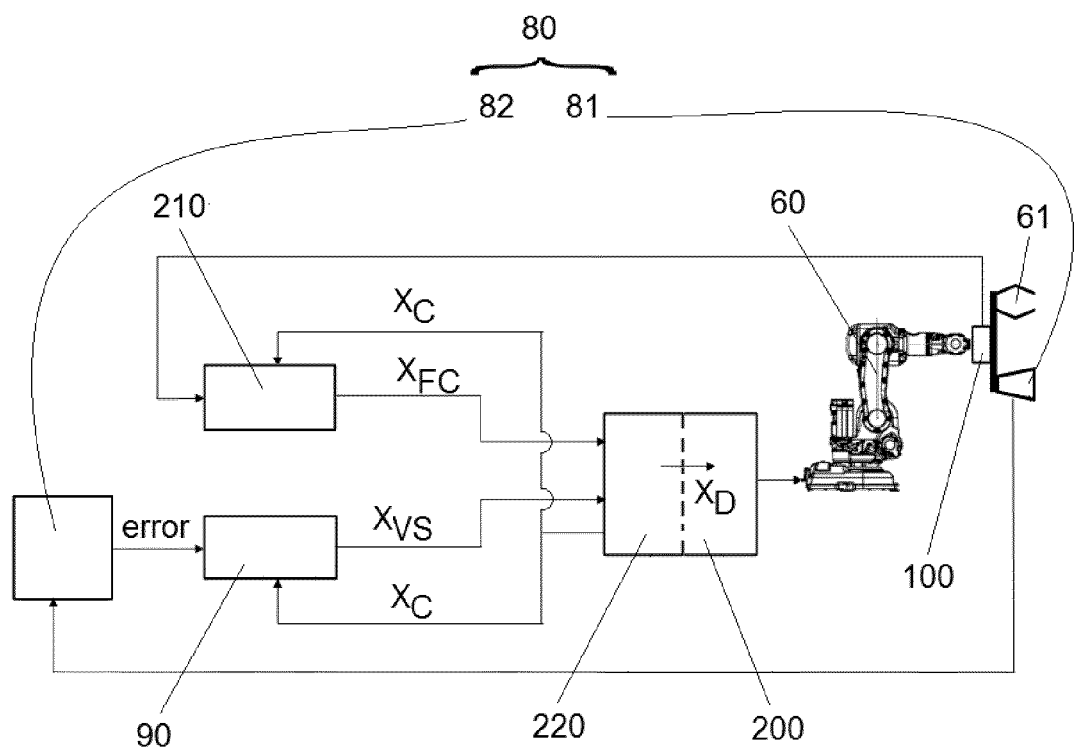
FIG. 3 is a block diagram of control circuits of an assembly unit according to some implementations.

FIG. 3 is a schematic block diagram of exemplary control circuits of the assembly unit 50.

As previously disclosed, the assembly unit 50 includes the industrial robot 60, which includes the end effector 61 attached to the wrist, and the vision system 80 with the vision sensor 81 (e.g. a camera), which is mounted on the robot such that it moves together with the end effector 61.

An example of a vision sensor available on the market that is suitable for this application may be the Intel® RealSense™ Camera SR300.

Figure 5:
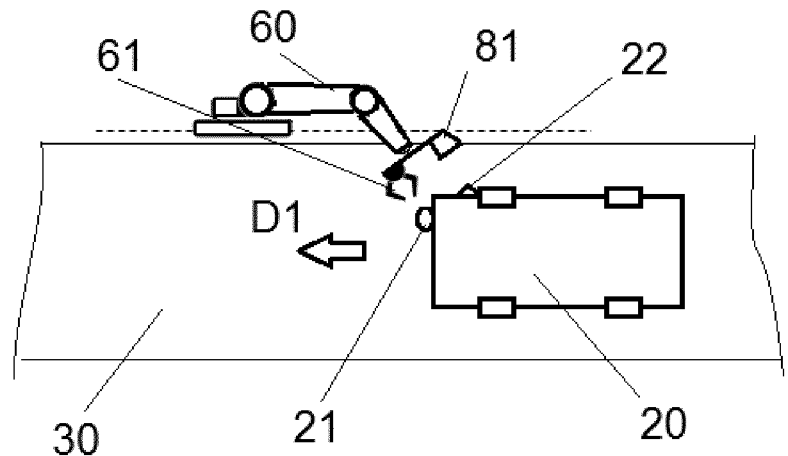
FIG. 5 shows schematically an implementation of an assembly unit including a vision system monitoring a marker.

The vision system 80, and in particular the vision sensor 81, may be arranged to monitor in real time the position of the target area 21 of the vehicle body 20 directly, by obtaining images of the target area 21 of the target area 21 itself, or indirectly, by obtaining images of a marker 22 that moves together with the target area 21, as shown in the schematic illustration of FIG. 5.

Typically, the marker 22 will be another point or area of the vehicle body 20, so that there is no relative movement, vibrations, etc. between the target area 21 and the marker 22, and is located in a position that remains in the field of view of the vision sensor 81 during the whole trajectory of the end effector 61, between an initial position and a final assembly position.

The marker 22 may for example be a label with a graphic symbol, which is applied to a suitable point of the vehicle body 20 before the assembly operation, and usually removed afterwards.

However, it is also possible to use a visible element of the vehicle body as marker 22, for example an element of the vehicle body with well-defined edges and sharp contrast, which is easily monitored by a computer vision system. Examples of suitable elements on a vehicle body may be a hole, the edge of a hole or opening, a line, or a particular shape.

Turning back to FIG. 3, the assembly unit 50 may further include a force/torque sensor 100, for example mounted on the robot 60 between the wrist and the end effector 61, which provides readings of the external forces acting on the end effector.

The force/torque sensor 100 may be typically provided with resistance strain gauges to measure the strain applied in several degrees of freedom, for example in all six degrees of freedom (three forces and three torques), as well as suitable electronics to process the readings from the strain gauges and provide corresponding signals to a robot controller 200 that will be described later. The signals depend on the external forces acting on the end effector, and therefore they represent the situation of physical interaction or contact between the end effector and an external part, i.e. the part on which an assembly operation is being carried out by the robot 60.

Examples of commercially available force/torque sensors that could be employed in the control of the robot in a compliant behaviour process are those of the 6-Axis Force Moment Sensor FT series available from Schunk, Germany (www.schunk.com).

The assembly unit 50 may further include an image processing module 82, a vision controller module 90, a force/torque controller module 210, a real time interface to robot module 220 and the robot controller module 200 previously cited.

The image processing module 82 may be configured to receive images of the target area 21 or of the marker 22 from the vision sensor 81 through a communication established between, for example, a communication sub-module included in the image processing module 82 and a communication sub-module included in the vision sensor 81. Said communication may be secured by, for example, cryptographic keys and/or an SSL tunnel established between them.

Processing of the images by the image processing module 82 may include:
receiving an image from the camera or other vision sensor 81;
detecting a feature on the received image, which may be either the position and orientation of an object in the image (Position-Based Visual Servoing—PBVS) or a more abstract feature, such as points, straight lines, curve lines, etc. of the image (Image-Based Visual Servoing—IBVS);

calculating an error between the detected feature and the same feature in a reference image, which is stored in the image processing module in an earlier learning step. In the reference image the feature is as seen by the camera when the camera is in a known position, for example at the end of the assembly operation, when the end effector of the robot completes the assembly at the target area. The error is therefore representative of the difference between the current position and the desired position of the camera, and therefore also of the difference between the current position and the desired position of the end effector;

sending the calculated error to the vision controller module 90.

The error is therefore calculated by comparing an image captured by the vision sensor with a reference image previously obtained in a learning process and stored in the image processing module.

According to some examples, the image processing module 82 may be configured to receive and process images at a frequency of at least 15 Hz, for example a frequency of at least 20 Hz. In some examples the frequency may be between 20 and 40 Hz, for example with an image being received and processed every 40-50 milliseconds (i.e. a frequency of 25-20 Hz), to allow following the target area in such a way to at least partly compensate the errors described above in relation with FIG. 2.

Furthermore, the vision controller module 90 may be configured to:

calculate the velocity of the camera 81 that is necessary to correct the error received from the image processing module 82. The velocity may be calculated based on a control law, e.g.:

$$\text{velocity } V_{VS}=\text{gain}*J*\text{error}$$

where the gain may be, for example, a proportional, integral and/or a derivative gain (PID) and J is an interaction matrix or Jacobian matrix, which is the matrix defining the dynamic relationship between the error and the velocity of the camera. In some examples, the gain may be variable, for example it may be a function of the error, for example it may be inversely dependent on the error, so that if the value of the error is low the gain may be higher. On the contrary, if the error value is high the gain may be lower. Basically, the main object in this case is to avoid that for very high values of the error (when the end effector is still far from the target) the speed of the camera is too high, with the risk of accidents, while for very low values of the error (when the end effector is very close to the target) the speed is too low and there is a risk that the end effector may take too long to reach the target;

convert the calculated velocity in the camera coordinate system to the coordinate system of the end effector 61 of the robot (Tool Center Point, TCP);

calculate an increase in position $\Delta X_{VS}$ from the velocity;

calculate a desired position $X_{VS}$ of the end effector 61 from the calculated increase in position $\Delta X_{VS}$ and the current position $X_C$ of the end effector 61, which is received from the real time interface to robot module 220;

send the calculated desired position $X_{VS}$ to the real time interface to robot module 220.

This desired position $X_{VS}$ may be employed for the control of the movement of the end effector 61 of the robot, based on the readings of the vision system 80.

This process may be performed every 4 milliseconds (i.e. a frequency of 250 Hz). Said indicated time is a reference example. Since this frequency may be higher than the frequency of the image processing module 82, the vision control module 90 will provide successive desired positions $X_{VS}$, in a number of successive iterations, from the same error signal provided by the image processing module (and therefore the same calculated increase in position), but applying the increase in position to a new position $X_C$ provided by the real time interface to robot module 220, because the end effector of the robot moves at each iteration.

Basically, the vision system 80, the image processing module 82, the vision controller module 90, the real time interface to robot 220 and the robot controller module 200 allow executing a visual servoing process to control the movement of the end effector during the assembly operation. In this process the movement of the end effector of the robot is therefore controlled in real time based on the readings of the vision system 80.

The force/torque controller module 210 may be configured to:

receive force and torque values from the force/torque sensor 100;

subtract a reference value (e.g. the bending moment due to the weight of the end effector 61 of the robot and the weight of the assembly element) from the received force value, obtaining net force and torque values;

calculate a velocity, from the net force/torque values, applying a gain and a transformation intended to allow a degree of compliant behaviour to the end effector:

$$\text{velocity } V_{FC}=\text{gain}*M*\text{net force/torque}$$

where M is a transformation matrix which together with the gain constitute the control law that establishes how the robot has to respond and move, depending on the detected force and torque conditions, in order to be compliant and prevent damage to the robot and/or the environment. The gain may be a constant or it may be variable, e.g. a function of the force. The gain and transformation matrix may be established for each application depending on the specific assembly operation, taking into account the accuracy needed, the risk of damage to the robot itself and to the parts, etc.

calculate an increase in position $\Delta X_{FC}$ from the velocity;

calculate a desired position $X_{FC}$ of the end effector 61 from the calculated increase in position $\Delta X_{FC}$ and the current position $X_C$ of the end effector 61, which is received from the real time interface to robot module 220;

send the calculated desired position $X_{FC}$ to the real time interface to robot module 220.

This process may be performed every 4 milliseconds (i.e. a frequency of 250 Hz). Said indicated time is a reference example. This frequency may be the same as the frequency of the vision control module 90, such that the real time interface to robot module 220 will receive at each iteration desired positions $X_{VS}$ and $X_{FC}$.

The force/torque sensor 100, the force/torque controller module 210, the real time interface to robot module 220 and the robot controller module 200 allow executing a compliant behaviour process to control the movement of the end effector during the assembly operation. In this process the movement of the end effector of the robot may therefore be controlled in real time based on the readings of the force sensor 100.

The force-torque sensor 100 and the force controller module 210 may be considered a compliant behaviour system. In other examples the movement of the end effector may be controlled in real time based on different compliant behaviour systems.

In another example of a compliant behaviour system, an external sensor such as the force/torque sensor 100 may be omitted, and the system may use as inputs for a force/torque controller module 210 (which may be part of the robot controller 200) the torques on the internal motors of the robot, which are proportional to the consumed current. An external force on the end effector, due to a physical interaction with the environment (e.g. contact with the target area) may then be detected by a variation of the torques with respect to an internal dynamic model of the robot. A control law and gain may then be applied, as described above, in order to calculate a desired velocity in order to make the end effector compliant in at least one direction.

In a further example, a compliant behaviour system may be passive: for example, a mechanical flotation system may be foreseen, where the end effector is not mounted rigid on the wrist, but with the interposition of spring elements or the like, such that if it contacts an object, its behaviour is relatively compliant, depending on the elastic features of the mounting. In this case, in a compliant behaviour process of the assembly operation the end effector is controlled based on the vision system only, but certain deviations from the intended path are allowed, due to the floating mounting, in response to a physical interaction of the end effector with an object of the environment.

Other compliant behaviour systems may combine more than one solution: for example it may include a force/torque control module and also a mechanical flotation system for the end effector.

The real time interface to robot module 220 may be configured to:
receive the desired positions $X_{FC}$ and $X_{VS}$ generated by the force/torque controller module 210 and the vision controller module 90;
combine the received desired positions $X_{FC}$ and $X_{VS}$ by an average, a weighted sum, or other, to obtain a resulting desired position $X_D$;
send the desired position $X_D$ to the robot controller module 200.

The resulting desired position $X_D$ depends inter alia on the gains applied by the force/torque controller module 210 and the vision controller module 90. The gains may be adapted to each specific assembly operation or to each phase of an assembly operation: for example, the gain applied to the force/torque controller module 210 may be higher when the parts involved in the assembly operation are particularly fragile, to give more weight to the compliant behaviour component and avoid the risk of damaging the parts, even if this may make the operation slower, because the trajectory set by the vision system may not be followed so closely.

The robot controller module 200 may be configured to receive the desired position $X_D$ from the real time interface to robot module 220 and act on the motors or any other driving element of the robot 60 to move the end effector 61 to the desired position $X_D$.

The robot controller module 200 and the real time interface to robot module 220 may be the same module or not, that is, the real time interface to robot module 220 may be external or not to the robot controller module 200.

On the other hand, the expression "robot controller" may be used herein as including both modules 200 and 220 as well as at least part of the vision controller module 90, the force controller module 210, etc.

All the errors, velocities, increment of positions $\Delta X_{FC}$ and $\Delta X_{VS}$, current position $X_C$ and desired positions $X_{FC}$, $X_{VS}$, $X_D$ are vectorial variables, which include displacements and rotations with respect to one or more coordinate systems. The gains may also be vectorial variables.

Furthermore, even though the above description has been made of a case in which the force/torque controller module 210 and the vision controller module 90 determine desired positions from increments of position, and increments of positions from velocities, and the desired positions are then combined, other systems may work combining velocities, or increments of positions, or combining e.g. positions and increments of positions or velocities. In some cases, for example if the combination is made in the real time interface to robot module 220 with velocities or increments of positions, there is no need to provide the current position $X_C$ to the vision controller module 90 and the force controller module 210.

If the different circuits of FIG. 3, for example the image processing module 82 and the vision sensor 81, are close enough to each other, they may be wired (for example, through Ethernet technology) or may be connected through short-range wireless communication technologies, for example, Bluetooth (e.g. BLE—Bluetooth Low Energy), NFC, Zigbee or WiFi technology. If they are distant, they may be connected through long-range wireless communication technologies such as GSM, GPRS, 3G, 4G or satellite technology or wired technologies (for example, through optical fiber, ADSL, etc.).

Any of the modules disclosed with reference to FIG. 3 may include or may be implemented by electronics, computing or a combination of them, that is, electronics or computer systems may be used interchangeably so that a part of the described solutions may be electronic and the other part may be computer-based, or all described solutions may be electronic or all described solutions may be computer-based.

Figure 4:
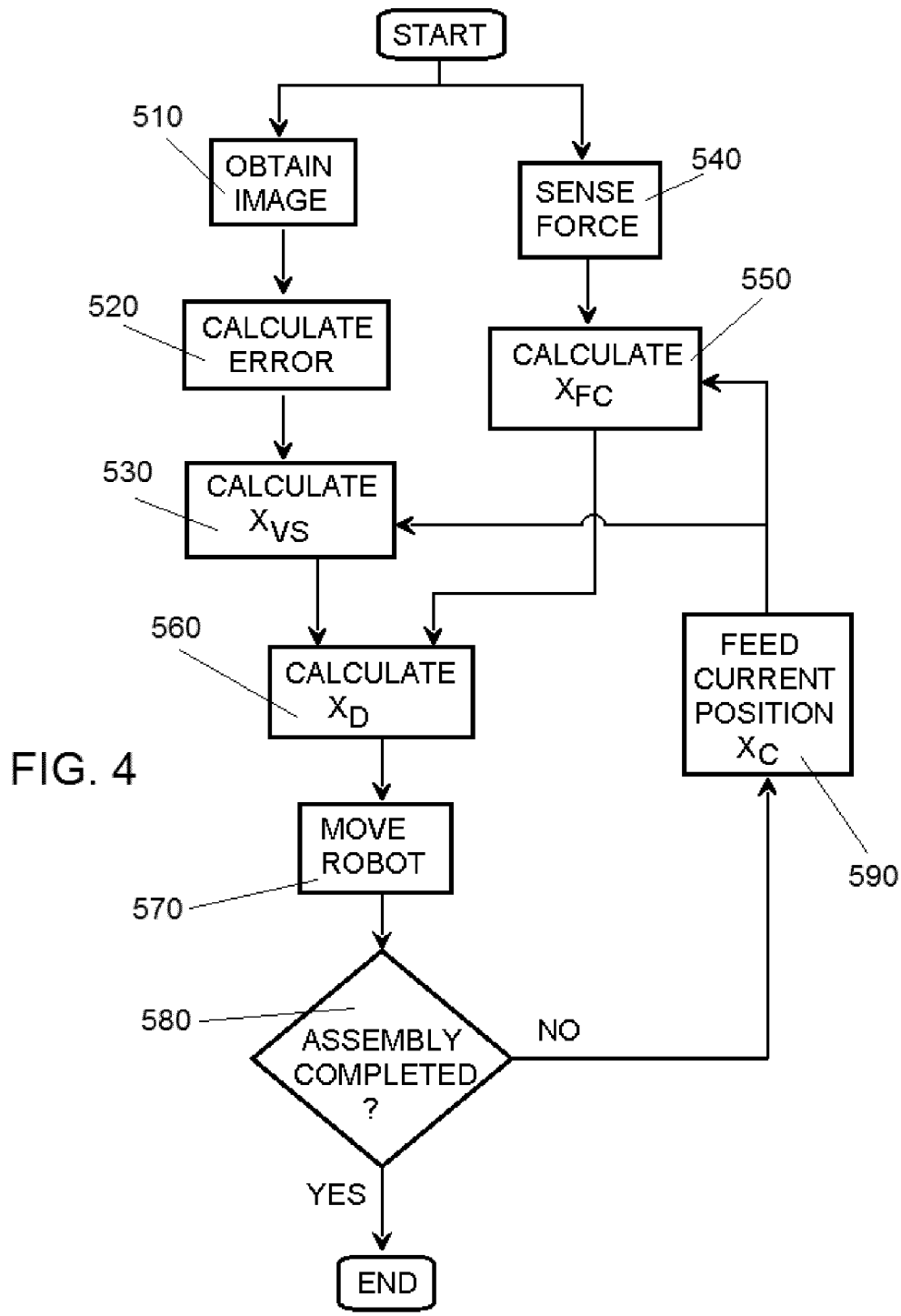
FIG. 4 is a flow diagram of part of a method according to an example.

FIG. 4 is a flow diagram to schematically illustrate how a visual servoing process and a compliant behaviour process operate during an assembly operation with an assembly unit that is provided with a real time vision system and a compliant behaviour system such as described above in relation to FIG. 3.

In this example of the method for assembling parts, an image of the target area, or of a marker, is obtained in block 510.

In block 520, an error is calculated between the obtained image and a reference.

In block 530 the desired position $X_{VS}$ for the vision system is determined, as a function of the error and the current position $X_C$.

At the same time, the forces on the end effector are sensed in block 540, and in block 550 the desired position $X_{FC}$ for the compliant behaviour system is determined, as a function of the sensed forces and the current position $X_C$.

In block 560 a combined desired position $X_D$ is calculated, based on $X_{VS}$ and $X_{FC}$.

This desired positon $X_D$ is used in block 570 to move the end effector of the robot accordingly.

In block 580 a determination is made as to whether the assembly operation has been completed. In the affirmative, the operation ends; otherwise the current position of the end effector $X_C$ is fed to blocks 530 and 550, for a subsequent iteration.

The operations in blocks 510, 520 and 540 are repeated at given frequencies to provide updated values of the error in obtained images and of the sensed force, until the end of the operation.

In practice, while the external force on the end effector, obtained from the force sensed in block 540, is zero or negligible, the method is in an approaching step to the target area, performing a visual servoing process where the movement of the end effector is based on the desired position $X_{VS}$ for the vision system.

When the external force on the end effector, obtained from the force sensed in block 540, is not zero or negligible, the method is in a step of physical interaction with the target area, performing a visual servoing process simultaneously to a compliant behaviour process, where the movement of the end effector is based on the combination of the desired position $X_{VS}$ for the vision system and the desired position $X_{FC}$ for the compliant behaviour system, as explained above in relation to FIG. 3.

Figure 6:
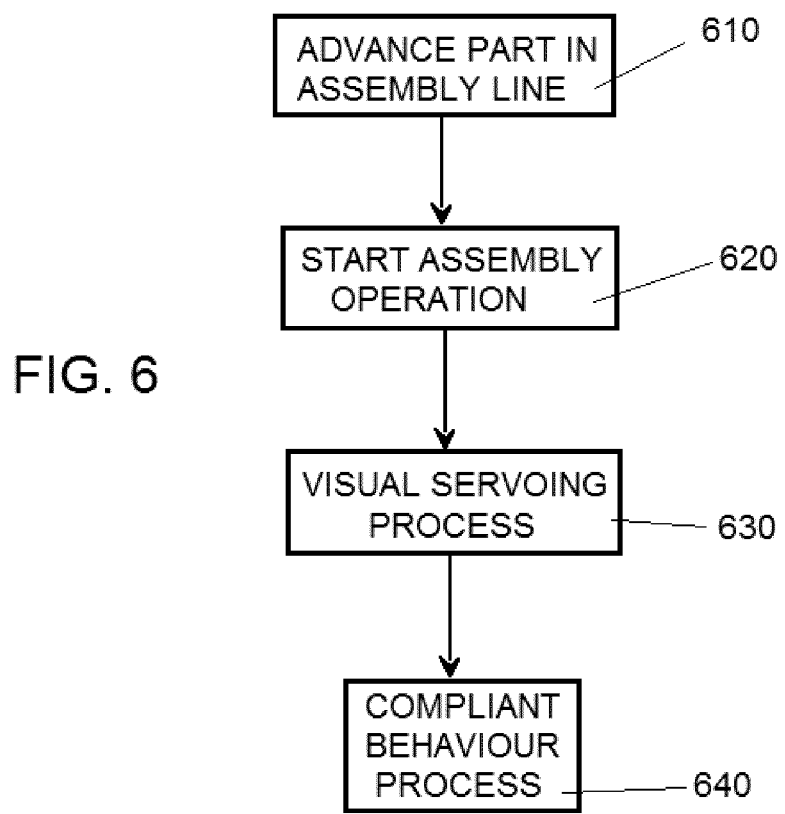
FIGS. 6 and 7 are flow diagrams of methods according to examples disclosed herein.

FIG. 6 illustrates a flow diagram of an example of a method for assembling parts in an assembly line: for example, for assembling a door on a vehicle body 20.

In block 610 a part, such as a vehicle body 20, is advanced in an assembly line, and in block 620 an assembly operation is started under the control of the robot controller 200.

The robot controller 200 may control the end effector 61 in real time to perform a desired assembly operation at the target area 21 of the vehicle body 20 while the vehicle body is advancing, with at least a visual servoing process represented by block 630 and a compliant behaviour process represented by block 640. The compliant behaviour process 640 may start for example once it is detected that an assembly element held by the end effector is in contact with, or very near, the target area of the vehicle body.

In the visual servoing process 630 the controller 200 controls the movement of the end effector 61 based on the readings of vision system 80, which as explained above provides signals related to the position of the target area 21.

In the compliant behaviour process 640 the controller 200 controls the movement of the end effector 61 at least to allow a degree of compliant behaviour in at least one direction, for example depending on the signals from the force/moment sensor 100. However, the readings of the vision system 80 may also continue to affect the movement of the end effector during this step.

The steps 630 and 640 of the above method may progressively lead the end effector 61 of the robot 60 from an initial position where an assembly element held by the end effector is at a distance from the target area, towards a final position in which the assembly operation is completed: for example, a door held by the end effector is mounted on the vehicle body, for example by inserting one or two hinge pins in corresponding hinge bushings of the vehicle body.

The method may include more than one visual servoing process or compliant behaviour process, and these processes may be alternate and/or simultaneous: for example, once the assembly element (the hinge pin of a door, for example) reaches the target area and there is contact with the vehicle body (with the hinge bushing of the door on the vehicle body, for example), the robot controller 200 still maintains a visual servoing process to guide the final movements of the end effector, but a compliant behaviour process is also operated in order to correct or allow deviation from the movements intended by the visual servoing control, for example by combining the signals from the vision system and the compliant behaviour system as described above.

A method for assembling parts in an assembly line may include further steps, prior to the visual servoing and compliant behaviour processes of the example of FIG. 6. An example of such a method is illustrated by the flow diagram of FIG. 7, with reference to an assembly unit 50 as shown in FIGS. 1 to 3.

Figure 7:
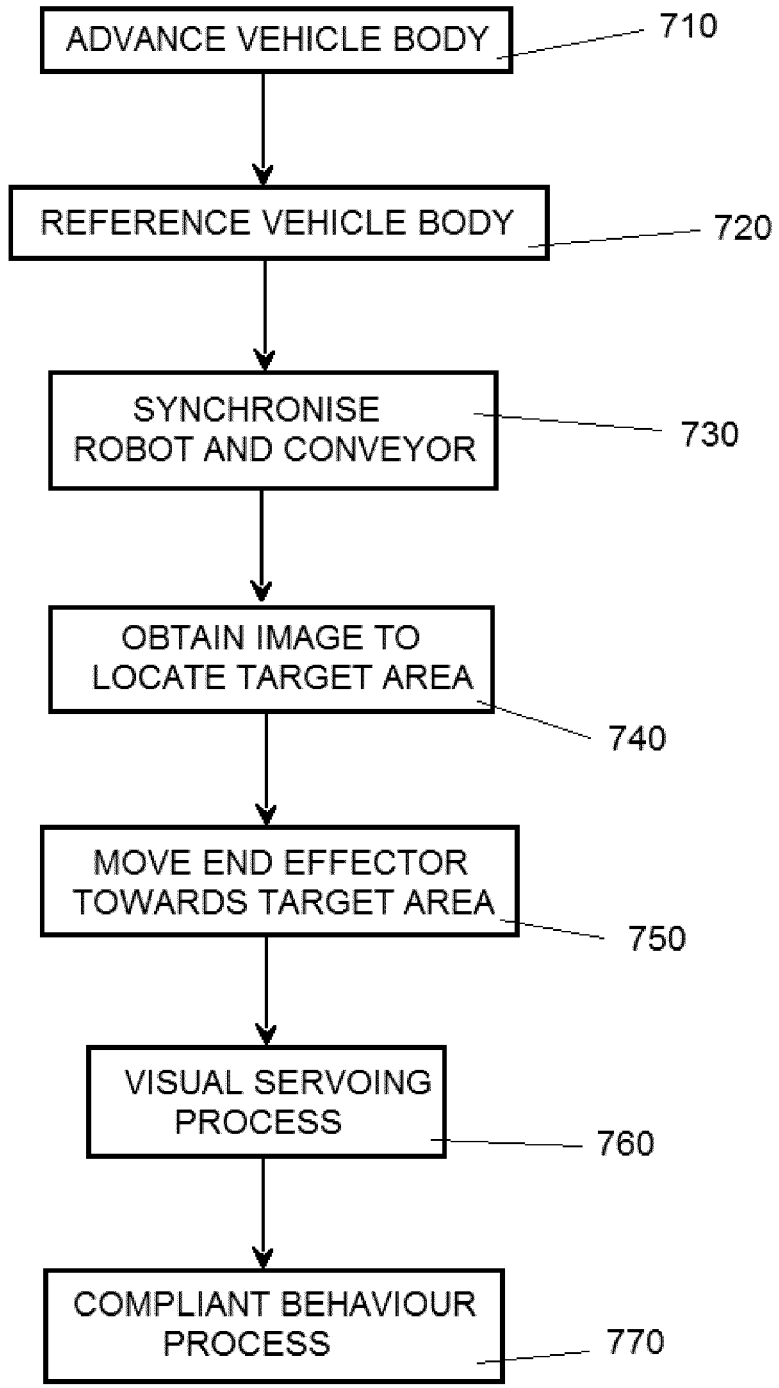

In FIG. 7 the vehicle body 20 is advanced on a conveyor 30 in block 710, and in block 720 the vehicle body 20 is referenced with respect to the conveyor's coordinate system, for example by a laser sensor (not shown).

In block 730 the robot 60, with an assembly element (not shown) held by the end effector 61, is controlled to travel on the track 70 in the advance direction D1 of the assembly line, synchronised with the advance of the conveyor 30, which is determined by the readings of digital encoder 31. As a result, the robot 60 and the target area 21 are now moving in parallel at approximately the same speed, and therefore maintaining a constant mutual position, except for the positioning errors E1, E2 and E3 discussed above in relation with FIG. 2.

In block 740, the position of the target area 21 of the part is determined by taking a general image of the part, i.e. an image from a certain distance which allows for identifying the target area (or the marker, if one is used) in the part, for example by a camera capture, and in block 750 the end effector 61 of the robot is moved towards the position of the target area 21 at a relatively fast speed, faster than the speed of a visual servoing process. This approximation brings the assembly element to a predetermined distance from the target area: this distance will be selected depending on the operation, the shape and size of the parts to be assembled, the accuracy required, etc. For example, it may be a distance between 50 and 500 mm from the target area. In some simple cases the end effector 61 of the robot may be moved towards the position of the target area 21 without the need of taking an image to determine the position of the part.

The general image will usually be taken with the same camera or vision sensor 81 of the vision system 80, but it may also be taken with a different, dedicated camera (not shown). In other examples this step may not be necessary, or the target area may be located using simpler detectors, such as a laser detector. In further examples, the initial approximation to the target area may be done using the visual servoing process.

When a marker 22 is employed (see FIG. 5), the approximation in block 750 will also bring the marker 22 in the field of vision of the vision sensor 81.

The approximation to a target area 21 located by a camera capture allows compensating the errors E3 discussed in FIG. 2, due e.g. to positioning errors of the vehicle body on the conveyor or to deviations between the CAD design and each individual vehicle body.

A visual servoing process may then be launched in block 760, and a compliant behaviour process in block 770, as discussed for blocks 630 and 640 in FIG. 6.

Control by visual servoing of the assembly operation, for example as described above in relation to FIG. 3, allows at least partly compensating positioning errors E1, E2 described above in relation with FIG. 2. It may also compensate errors E3, if they are not compensated in a first approximation based on a camera capture, such as described above. Any residual errors are addressed by allowing compliant behaviour in the final movements of the assembly operation.

Figure 8:
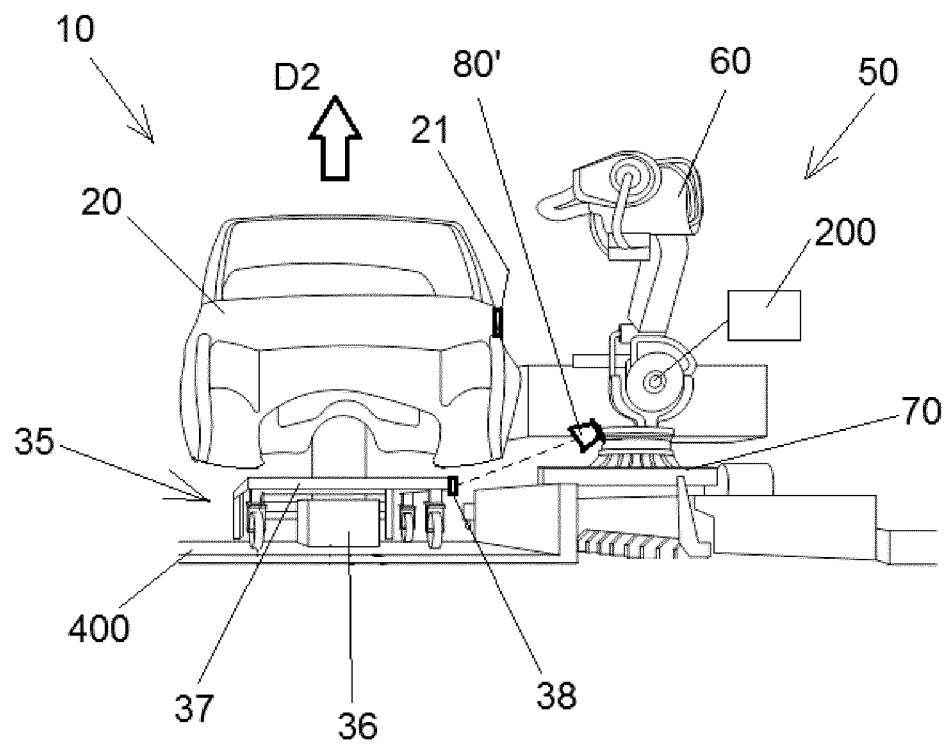
FIG. 8 illustrates a simplified end view of an assembly line with an assembly unit, in an example where the assembly line includes a transport system with AGVs.
Figure 9:
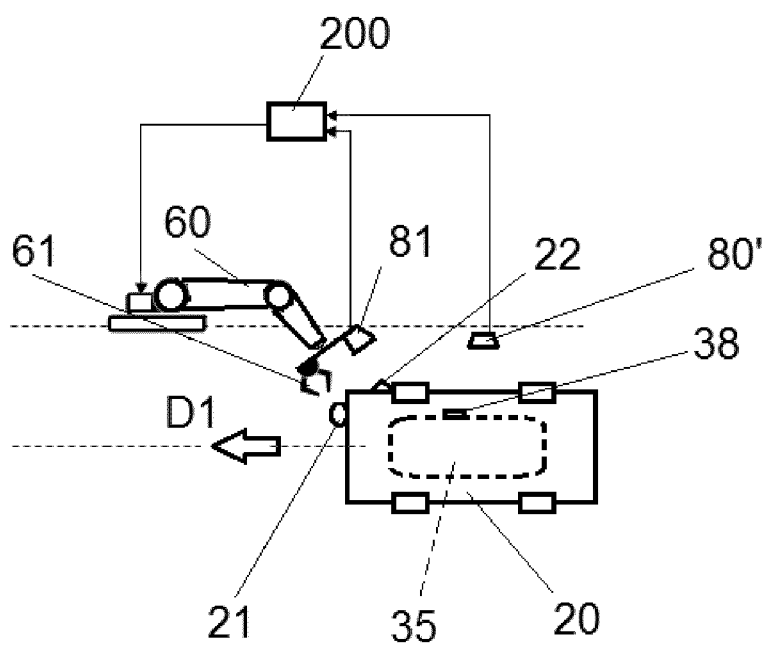
FIG. 9 shows schematically an implementation of an assembly unit with a first vision system monitoring an AGV and a second vision system monitoring a marker on a vehicle body part.

FIGS. 8 and 9 illustrate other implementations of an assembly line with an assembly unit. As shown in FIG. 8, the transport of the vehicle body 20 or other part along the assembly line and past an assembly unit 50 may be provided by an Automated Guided Vehicle (AGV) 35, instead of a conveyor. In FIG. 9 the AGV 35 is shown in dotted lines, as it is under the vehicle body 20.

An AGV 35 may include a driving unit 36 with wheels and a carriage 37 adapted to support the vehicle body 20. The carriage 37 is attached to the driving unit 36 through a stem (not shown) with a freedom of movement in a vertical direction. Other AGVs may include different constructions. For example the driving unit may cause the advance of the carriage, but the carriage itself may not be mounted on the driving unit and may support the weight of the vehicle body or other part.

The AGV 35 is configured for conveying the vehicle body 20 on the ground, for example over an irregular floor 400 in an automotive production line 10, along the advance direction (perpendicular to the paper in FIG. 8), following elements such as markers or wires in the floor, magnets, lights, etc. (not shown).

In the example of FIG. 8, the assembly unit 50 may include an additional real time vision system 80' arranged to monitor the position of the AGV 35 as it advances along the assembly line 10, the output of the real time vision system 80' also being connected to the controller 200 of the robot 60 of the assembly unit 50, as shown schematically in FIG. 9.

The real time vision system 80' is similar to vision system 80 described above, and allows tracking the movement of the AGV 35 in the intended advance direction and also in other directions, for example the unintended movements in the vertical direction D2 that may be caused for example by an uneven floor.

The tracking of the AGV 35 is therefore more accurate, and vertical positioning errors of the target area 21 due to AGV oscillations, or errors in other directions, may be compensated or taken into account in the synchronisation of the robot 60 with the movement of the AGV 35, such that the robot 60 may travel on the track 70 synchronised with the advance of the AGV, and its end effector may be displaced vertically or in other directions synchronised with oscillations of the AGV.

In order to facilitate accurate tracking of the AGV movement, the AGV may be provided with an AGV marker 38 in a suitable position, such that the real time vision system 80' may track the position of the AGV marker 38. Such an AGV marker may be printed on the AGV, attached to the AGV permanently, or attached to the AGV only temporarily. A suitable marker 38 may also be a feature of the AGV itself, such as a hole, edge or the like. Generally AGVs have more straight lines and edges than a vehicle body, and therefore have several features that are suitable to be tracked by the vision system 80'.

The AGV may also be provided with several markers, in order to facilitate its monitoring by the vision system 80', such that there is always a marker in the field of view of the vision system 80' as the AGV advances. In other examples the vision system 80', or at least a vision sensor (no shown) of this vision system, may be mounted displaceable, for example on a carriage that is displaceable on a track parallel to the AGV path.

In some implementations the vision system 80' may be connected to a visual servoing control unit (not shown) different from the one that controls the assembly operation by the robot 60.

In the example of FIG. 8 the vision system 80' is arranged to travel with the robot 60 along the track 70, while in the example of FIG. 9 the real time vision system 80' is arranged stationary along the path of the AGV, i.e. along the assembly line, to monitor a marker or feature 38 of the AGV.

As shown in FIG. 9, the sensor 81 of the real time vision system 80 for monitoring the target area 21 or a marker 22 that moves together with the target area 21, and the sensor (not shown) of the real time vision system 80', are both connected to the robot controller 200. Based on the input of the two real time vision systems 80 and 80' the controller 200 controls the movement and operation of the robot 60 and of its end effector 61 in at least two directions, according to the examples described above. The controller 200 may also receive the input of a force/torque sensor, as disclosed above.

Figure 10:
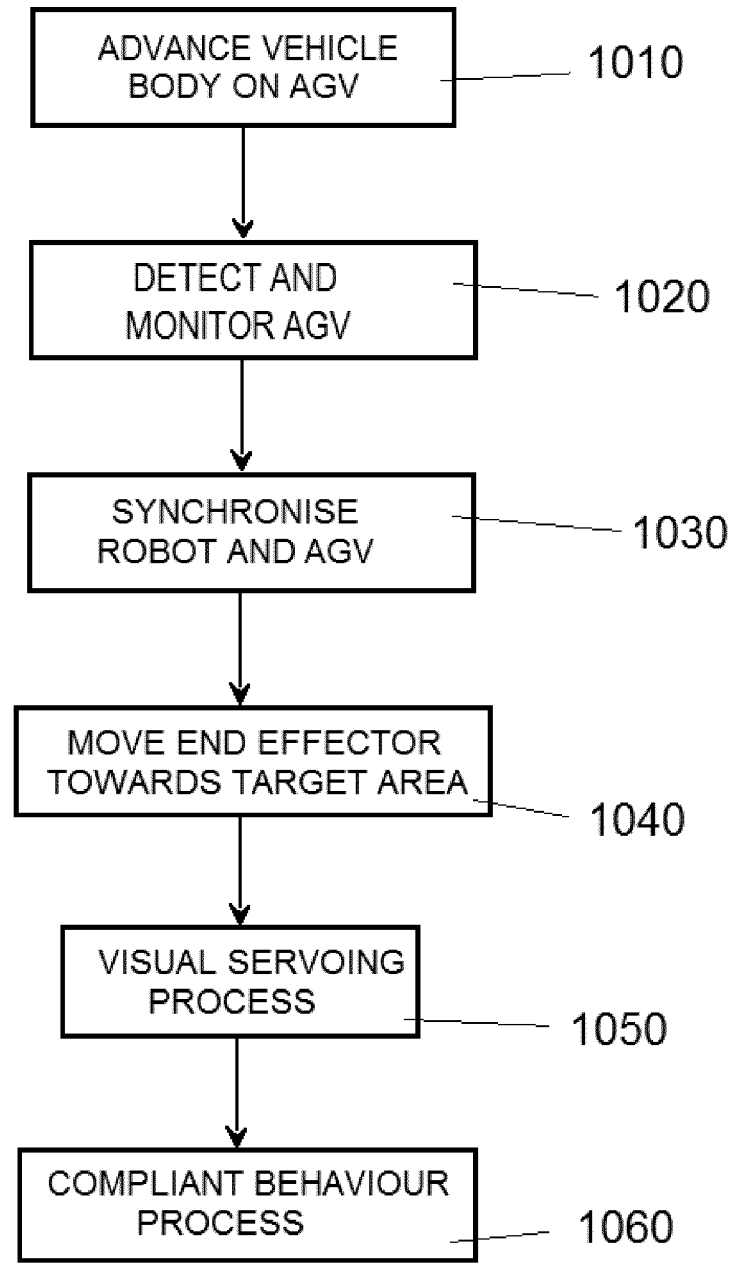
FIG. 10 is a flow diagram of a method according to an example disclosed herein.

In the example flow diagram of FIG. 10 the vehicle body 20 is advanced on an AGV in block 1010, and in block 1020 the real time vision system 80' detects and starts monitoring the AGV 35 by a visual servoing process.

In block 1030 the robot 60 is synchronised with the movement of the AGV 35: for example, robot 60 is controlled by the controller 200 to travel on the track 70 (FIG. 8) synchronised with the advance of the AGV 35, and the movement of the end effector 61 with respect to the base of the robot 60 may be synchronised with the vertical oscillations of the AGV 35. As a result, the end effector of the robot 60 and the target area 21 move in parallel at approximately the same speed and with the same vertical oscillation, and therefore maintaining a constant mutual position, except for the positioning errors between each vehicle body and AGV.

In block 1040, the end effector 61 of the robot is moved towards the position of the target area 21 at a relatively fast speed, and to a relatively accurate position, by virtue of the visual servoing control of the movement of the AGV, such that the target area 21, or the marker 22, come in the field of vision of the vision sensor 81. Optionally, before the end effector is moved towards the target area in block 1040, the position of this target area may be determined by taking a general image of the part, as explained in block 740 of FIG. 7; however, in some cases this step may be omitted.

A visual servoing process may then be launched in block 1050, and a compliant behaviour process in block 1060, as discussed above for FIGS. 6 and 7.

Monitoring of the AGV movement by the real time vision system 80' and synchronisation of the robot with the AGV movement as in blocks 1020, 1030 may continue during the visual servoing and compliant behaviour processes of blocks 1050 and 1060. The outputs of the two systems may be combined by the controller 200 such that the movement of the end effector may be a sum of the movements of the AGV and the movements of the target part on the AGV.

It is also foreseen to provide a real time vision system for tracking the movement of Automated Guided Vehicles (AGVs) in one direction or in more than one direction, in an assembly line or any other kind of manufacturing line that uses such AGVs to advance parts, and this independently from the configuration or operation of the particular assembly units or other elements of the manufacturing line. For example, it may be provided in an assembly line with assembly units that may operate with different methods from those including visual servoing and/or compliant behaviour processes which are disclosed in the present specification.

Such a real time vision system for tracking the movement of an AGV may have any features as described in the present disclosure for the vision system arranged to monitor the target area and used to control a robot operation, and its output or readings may be provided to a visual servoing control system operating as described herein for the robot control.

Such a visual servoing control system may control a robot, or any other kind of assembly unit, to perform a manufacturing operation on the part transported by the AGV, or may control the movement of the AGV itself. A compliant behaviour process may be included in the operation or not, depending on each particular case.

Indeed, a system and a method for tracking the movement of an AGV in one direction, or in more than one direction, by using a real time vision system arranged to monitor the position of the AGV, for example such as disclosed above, may be provided in any application of an AGV, other than advancing parts in assembly lines. The output of the real time vision system may be connected to a controller arranged to control an automated operation to be performed on the AGV or on a part that is advanced or supported by the AGV, or to control the position or operation of the AGV itself. Markers such as disclosed above may be employed in such a system or method.

Also disclosed herein is a control system for operating a manufacturing line, for example an automotive final assembly line, which includes a transport system for transporting parts or workpieces. The control system includes a real time vision system arranged to track the movement of a feature or marker of the transport system and a visual servoing control unit to control the position or operation of the transport system, and/or to control a manufacturing operation to be performed on the part or workpiece transported by the transport system, based on the output of the real time vision system. The real time vision system, or a vision sensor thereof, may be mounted displaceable along at least part of the path of the transport system and/or it may be arranged to track the movement of at least two markers of the transport system. The real time vision system may be arranged to track the movement of a feature or marker of the transport system in at least two directions, for example a horizontal advance direction and a vertical direction.

The transport system may be of any kind such as a chain driven roller conveyor, a pallet or skid conveyor, a skillet conveyor, an AGV (Automated Guided Vehicle), an overhead conveyor such as an overhead trolley or carrier, etc. The real time vision system may be arranged to track the movement of a feature or marker of the conveyor, skid, skillet, AGV, carrier or other element of the transport system.

Such a control system with a real time vision system and a visual servoing control unit may have any features as described in the present disclosure for the vision system and visual servoing system controlling a robot operation, and may operate accordingly. A compliant behaviour process may be included in the system or not, depending on each particular case.

In examples of methods and assembly units as disclosed herein, one industrial robot or several industrial robots may be employed, either working jointly, synchronised, or independently from each other. When several robots are employed, they may each have an associated vision system, or they may all be controlled using data from the same vision system.

In the present disclosure an "industrial robot" is an automatically controlled, reprogrammable multipurpose manipulator that is programmable in three or more axes, in accordance with the definition of ISO Standard 8373.

Examples of commercial industrial robots that may be employed in an assembly line such as disclosed herein may be models IRB 4600, IRB 6700, IRB 7600, etc., all available from ABB, Zurich, Switzerland (www.abb.com).

Different end effectors to be operated by an industrial robot may be mounted on the wrist of the robot: for example, grippers for handling an assembly element to be mounted on a part such as a vehicle body in an assembly line, tools such as a welding tool, etc.

The robots may be directly fixed to a floor through the robot base or it may be mounted on a supporting structure, roof mounted, mounted on a track, etc.

For reasons of completeness, various aspects of the developments hereof are set out in the following numbered clauses:

Clause 1. A method for assembling parts in an assembly line, such as an automotive final assembly line, comprising:
  advancing a part along the assembly line, the part having a target area at which an assembly operation is to be performed, and
  while the part is advancing, performing the assembly operation at the target area, with an industrial robot that is provided with an end effector,
  the assembly operation performed with the industrial robot comprising
    a visual servoing process in which the movement of the end effector of the robot is controlled in real time based at least on the readings of a real time vision system arranged to monitor the position of the target area, and
    a compliant behaviour process in which the movement of the end effector of the robot is controlled at least to allow compliant behaviour of the end effector in at least one direction.

Clause 2. A method according to clause 1, the real time vision system comprising a vision sensor mounted on the robot so that it moves together with the end effector.

Clause 3. A method according to any of the preceding clauses, the real time vision system comprising a vision sensor arranged to obtain images of a marker that moves together with the target area, the marker being selected between a visible element of the part, a marker applied on the part, or a marker provided on a label applied to the part.

Clause 4. A method according to any of the preceding clauses, further comprising controlling in the compliant behaviour process the movement of the end effector of the robot based at least on the external forces acting on the end effector.

Clause 5. A method according to clause 4, further comprising controlling in the compliant behaviour process the movement of the end effector of the robot based at least on the readings of a force/torque sensor mounted on the robot to detect external forces acting on the end effector.

Clause 6. A method according to any of the preceding clauses, each of the visual servoing process and the compliant behaviour process being simultaneously active during the assembly operation, and the movement of the end effector results from a combination of both processes.

Clause 7. A method according to any of the preceding clauses, advancing the part on a conveyor, and before and during the assembly operation controlling the robot to travel in the advance direction of the assembly line synchronised with the advance of the conveyor.

Clause 8. A method according to clause 7, once the robot is travelling synchronised with the advance of the conveyor, and before starting a visual servoing process of the assembly operation, determining the position of the target area of the part by taking a camera capture of the part, and moving the end effector of the robot towards the position of the target area, up to a predetermined distance.

Clause 9. An assembly unit for an assembly line, such as an automotive final assembly line, the assembly unit comprising:
an industrial robot that is provided with an end effector,
a real time vision system arranged to monitor the position of a target area of a part that advances along the assembly line,
a compliant behaviour system to allow compliant behaviour of the end effector in at least one direction, and
a robot controller to control the movement of the end effector of the robot to perform an assembly operation at the target area of the part,
the robot controller being configured to perform an assembly operation comprising
a visual servoing process in which the movement of the end effector of the robot is controlled in real time based on the readings of the real time vision system, and
a compliant behaviour process in which the movement of the end effector of the robot is controlled to allow compliant behaviour thereof.

Clause 10. An assembly unit according to clause 9, the real time vision system comprising a vision sensor and an image processing module to compare an image captured by the vision sensor to a reference image, and provide an error signal representative of the difference between a current position and a desired position of the end effector.

Clause 11. An assembly unit according to any of clauses 9 or 10, the compliant behaviour system comprising a sensor to detect external forces acting on the end effector.

Clause 12. An assembly unit according to any of clauses 9 to 11,
the vision system being arranged to provide signals representative of a desired position of the end effector according to the vision system,
the compliant behaviour system being arranged to provide signals representative of a desired position of the end effector according to the compliant behaviour system, and
the robot controller being configured to receive the signals from the real time vision system and the signals from the compliant behaviour system and to control the movement of the end effector based on a combination of the received signals in real time.

Clause 13. An automotive final assembly line, comprising a transport system to advance a part along the assembly line, and an assembly unit according to any of clauses 9 to 12.

Clause 14. An automotive final assembly line according to clause 13, further comprising a marker applying unit upstream of the assembly unit, for applying a marker to the part, and a marker removing unit downstream of the assembly unit, for removing the marker from the part.

Clause 15. An automotive final assembly line according to any of clauses 13 or 14, the transport system comprising an Automated Guided Vehicle (AGV), and the assembly unit comprising an additional real time vision system arranged to monitor the position of the AGV as it advances along the assembly line, the output of the additional real time vision system being connected to a controller of the robot of the assembly unit.

Clause 16. A system for controlling an Automated Guided Vehicle (AGV), comprising a real time vision system arranged for tracking the movement of a feature or marker of the AGV and a visual servoing control unit to control the position or operation of the AGV or to control an operation to be performed on the AGV or on a part supported on the AGV, based on the output of the real time vision system.

Clause 17. A system according to clause 16, the AGV being programmed to travel along a predetermined path, and at least a vision sensor of the real time vision system is mounted displaceable along at least part of the predetermined path of the AGV.

Clause 18. A system according to any one of clauses 16 or 17, the real time vision system being arranged for tracking the movement of a feature or marker of the AGV in at least two directions, preferably a horizontal advance direction and a vertical direction.

Clause 19. A system according to any one of clauses 16 to 18, the real time vision system being arranged for tracking the movement of at least two markers of the AGV.

Clause 20. A manufacturing line comprising Automated Guided Vehicles (AGVs) to advance parts along the line, and a system for controlling an Automated Guided Vehicle (AGV) according to any of clauses 16 to 19.

Clause 21. A manufacturing line comprising Automated Guided Vehicles (AGVs) to advance parts along the line, a real time vision system arranged for tracking the movement of a marker of the AGV, and a visual servoing control unit to control an operation to be performed on the AGV or on a part supported on the AGV, based on the output of the real time vision system.

Clause 22. A manufacturing line according to clause 21, the real time vision system being arranged for tracking the movement of a marker of the AGV in at least a horizontal advance direction and a vertical direction.

Clause 23. A control system for operating a manufacturing line, for example an automotive final assembly line comprising a transport system for transporting parts or workpieces, the control system comprising
a real time vision system arranged to track the movement of a feature or marker of the transport system and
a visual servoing control unit to control the position or operation of the transport system, and/or to control a manufacturing operation to be performed on the part or workpiece transported by the transport system, based on the output of the real time vision system.

Clause 24. A control system according to clause 23, at least a vision sensor of the real time vision system being mounted displaceable along at least part of the path of the transport system.

Clause 25. A system according to any one of clauses 23 or 24, the real time vision system being arranged to track the movement of a feature or marker of the transport system in at least two directions, preferably a horizontal advance direction and a vertical direction.

Clause 26. A system according to any one of clauses 23 to 25, the real time vision system being arranged to track the movement of at least two markers of the transport system.

Clause 27. A manufacturing line comprising a transport system to advance parts along the line and a control system according to any of clauses 23 to 26.

Although only a number of particular implementations and examples have been disclosed herein, it will be understood by those skilled in the art that other alternative implementations and/or uses of the disclosed innovation and obvious modifications and equivalents thereof are possible. Furthermore, the present disclosure covers all possible combinations of the particular implementations described. The scope of the present disclosure should not be limited by particular implementations, but should be determined only by a fair reading of the claims that follow.

What is claimed is:
1. A method for assembling parts in an assembly line, comprising:
advancing a part along the assembly line with an Automated Guided Vehicle (AGV), arranging a first real time vision system, provided with a vision sensor mounted stationary in the assembly line, to track movement of the AGV in at least two directions, and providing readings of the first real time vision system to a visual servoing controller arranged to control an assembly unit of the assembly line to perform an automated operation on the part that is advanced or supported by the AGV;

the assembly unit comprising:
an industrial robot that is provided with a controller, a robot base and a robot wrist, and an end effector attached to the robot wrist, and the part having a target area at which an assembly operation is to be performed, the method further comprising, while the part is advancing, providing the readings of the first real time vision system to the controller of the industrial robot, the controller of the industrial robot synchronizing a displacement of the industrial robot or a displacement of the end effector with an advance of the AGV along the assembly line in an advance direction based on the readings of the first real time vision system, and the controller of the industrial robot further displacing the end effector of the robot with respect to the robot base, in a vertical direction, synchronized with vertical oscillations of the AGV based on the readings of the first real time vision system, and performing the assembly operation at the target area with the industrial robot, the assembly operation performed with the industrial robot comprising
a visual servoing process in which a movement of the end effector of the industrial robot is further controlled in real time based at least on readings of a second real time vision system comprising a vision sensor mounted on the robot so that it moves together with the end effector and arranged to monitor a position of the target area, and
a compliant behaviour process in which a movement of the end effector of the industrial robot is further controlled to allow compliant behaviour of the end effector in at least one direction.

2. A method according to claim 1, the controller of the industrial robot synchronizing the displacement of the industrial robot such that the industrial robot travels on a track synchronized with the advance of the AGV based on the readings of the first real time vision system.

3. A method according to claim 1, a vision sensor of the first real time vision system capturing an image of a marker or feature of the AGV, an image processing module of the first real time vision system providing an error signal representative of the displacement of the AGV based on the captured image, and the controller controlling the assembly unit at least based on the error signal.

4. A method according to claim 1, the first real time vision system being arranged to monitor a position of at least two markers of the AGV.

5. A method according to claim 1, the first real time vision system comprising a vision sensor mounted displaceable on a track parallel to a path of the AGV.

6. An automotive final assembly line, comprising
a transport system with one or more Automated Guided Vehicles (AGVs) to advance one or more parts along the final assembly line, and an assembly unit comprising:
an industrial robot, the industrial robot comprising a base, a wrist, an end effector to be attached to the wrist, and a robot controller to control an automated assembly operation to be performed by the end effector on a part that is advanced or supported by one of the one or more AGVs along the assembly line, the robot controller comprising a visual servoing controller,
a first real time vision system with a vision sensor mounted stationary in the assembly line to monitor a position of the AGV in a horizontal advance direction along the assembly line and to monitor oscillations of the AGV in a vertical direction, readings of the first real time vision system being provided to the visual servoing controller of the robot controller,
a second real time vision system arranged to monitor a position of a target area of the part that is advanced or supported by the AGV along the assembly line, and
a compliant behaviour system to allow compliant behaviour of the end effector in at least one direction,
the output of the second real time vision system being connected to the robot controller, and the robot controller being configured to perform an assembly operation comprising:
a displacement of the industrial robot or the end effector synchronized with an advance of the AGV along the assembly line in an advance direction, and a movement of the end effector of the robot synchronized with the vertical oscillations of the AGV, based on readings of the first real time vision system,
a visual servoing process in which the movement of the end effector of the robot is controlled in real time based on readings of the second real time vision system, and
a compliant behaviour process in which the movement of the end effector of the robot is controlled to allow compliant behaviour thereof.

7. An automotive final assembly line according to claim 6, the industrial robot comprising three or more programmable degrees of freedom or axes between the base and the wrist, each degree of freedom having an associated driving element controlled by the robot controller.

8. An automotive final assembly line according to claim 6, the end effector comprising a tool or a gripper.

9. An automotive final assembly line according to claim 6, the vision sensor of the first real time vision system being arranged to capture an image of a marker or feature of the AGV, and the first real time vision system comprising an image processing module to receive the captured image and to provide to the controller an error signal representative of a displacement of the AGV, based on the captured image.

10. An automotive final assembly line according to claim 9, the first real time vision system being arranged to monitor a position of at least two markers of the AGV.

11. A method for assembling parts in an assembly line, comprising:
advancing a part along the assembly line with an Automated Guided Vehicle (AGV), the part having a target area at which an assembly operation is to be performed,
providing a first real time vision system to monitor a position of the AGV in at least a horizontal advance direction and a vertical direction, the first real time vision system being stationary in the assembly line,
providing an assembly unit comprising an industrial robot with an end effector and with a robot controller to control an automated assembly operation to be performed by the end effector at the target area of the part that is advanced by the AGV, the method further comprising, while the part is advancing, displacing the robot or the end effector of the robot synchronized with the advance of the AGV along the assembly line in the advance direction based on readings of the first real time vision system, and displacing the end effector of the robot in a vertical direction synchronized with vertical oscillations of the AGV based on readings of the first real time vision system, and performing the assembly operation at the target area with the industrial robot, the assembly operation performed with the industrial robot comprising a visual servoing process in which movement of the end effector of the robot is controlled in real time based at least on readings of a second real time vision system arranged to monitor a position of the target area, and a compliant behaviour process in which movement of the end effector of the robot is controlled at least to allow compliant behaviour of the end effector in at least one direction.

12. A method according to claim 11, the first real time vision system to monitor a position of the AGV tracks movement of a marker of the AGV.

13. A method according to claim 11, the first real time vision system to monitor a position of the AGV tracks movement of two markers of the AGV.

\* \* \* \* \*